3,150,161
PROCESS FOR PREPARING ORGANO-SULFATES

Leslie G. Nunn, Jr., Metuchen, N.J., assignor to General Aniline & Film Corporation, New York, N.Y., a corporation of Delaware
No Drawing. Filed Dec. 1, 1959, Ser. No. 856,365
11 Claims. (Cl. 260—457)

This invention relates to the production of surface active agents, and more particularly to an improved process for preparing anionic surface active agents of the sulfate ester type.

The production of anionic surface active sulfate esters by the esterification of higher molecular weight hydroxylic organic compounds with a number of different sulfating agents including sulfuric acid, sulfamic acid, chlorosulfonic acid, sulfur trioxide and the like is well known and has been well documented in prior patents and literature. As so produced, such sulfate ester compositions must generally be specially treated to decolorize them in order to adapt them for certain uses in which a colorless product is required. Further, such agents generally discolor or darken still further upon storage.

It is an object of this invention to provide a process for producing anionic surface active sulfate esters which will result in lighter colored or substantially colorless products. Another object of this invention is to improve the sulfating processes hithertofore employed whereby lighter colored or substantially colorless products are formed. Still another object of this invention is the provision of such a process which will result in sulfate ester products having improved stability to discoloration or darkening on storage. Other objects and advantages will appear as the description proceeds.

The attainment of the above objects is made possible by my discovery that when a higher molecular weight hydroxylic organic compound is reacted with a sulfating agent such as sulfamic acid, chlorosulfonic acid or sulfur trioxide under the known conditions for producing the sulfate ester of such hydroxylic organic compound, a lighter colored or substantially colorless product is obtained when the reaction is carried out in the presence of a small or catalytic amount of a phosphorus-containing compound selected from the group consisting of hypophosphorous acid, salts of hypophosphorous acid, phosphorous acid, and salts and esters of phosphorous acid. More particularly, my invention includes a process comprising reaction (1) a hydroxylic organic compound selected from the group consisting of aliphatic hydrocarbon alcohols of at least 6 carbon atoms and nonionic surface active agents having the molecular configuration of a condensation product of at least one mole of ethylene oxide with one mole of a compound containing at least 6 carbon atoms and a reactive hydrogen atom with (2) a sulfating agent selected from the group consisting of sulfamic acid, chlorosulfonic acid and sulfur trioxide, in the presence of a small amount of a phosphorus-containing compound selected from the group consisting of hypophosphorous acid, salts of hypophosphorous acid, phosphorous acid, and salts and esters of phosphorous acid.

By the use of such compounds in the described sulfation reaction, it has been found that an unexpected and substantial improvement in the (absence of) color of the products and the resistance of such products to discoloration in storage is obtained. Products resulting from the use of the present invention generally have VCS (Varnish Color Scale, Gardner Scale, Standards of 1933) values of at least one less than products of the same process carried out in the absence of the hypophosphorous or phosphorous acid compound. Products having a VCS color of about 1 or less are thus made possible, as compared with VCS colors of from about 2 to 7 or more for products produced without the aid of the present invention. Further, the products of this invention have been found to resist discoloration or darkening even after storage for 3 to 6 months.

The process of this invention is applicable in any of the known processes wherein a hydroxylic organic compound of the above described type is sulfated with sulfamic acid, chlorosulfonic acid, or sulfur trioxide or other relatively fast-acting sulfating agents. Since the object of the process is the production of colorless or substantially colorless products and the minimization of the formation of colored bodies in the reaction, acceleration of the process is highly desirable since color degradation during the reaction increases as the duration of reaction increases. Sulfuric acid, a common sulfating agent, has, for example, not been found sufficiently active or fast-acting to enable the attainment of the desired improvements in prevention of formation of colored bodies.

The nonionic surface active agents employed as reactants in the present invention are well known in the art and are disclosed along with suitable methods for their preparation in numerous patents and other publications. In general, they may be obtained by condensing a polyglycol ether containing the required number of alkanoxy groups or an alkylene oxide such as propylene oxide, butylene oxide, or preferably ethylene oxide, with an organic compound containing a reactive hydrogen atom. As such compounds containing a reactive hydrogen atom there may be mentioned alcohols, phenols, thiols, primary and secondary amines, and carboxylic and sulfonic acids and their amides. The amount of alkylene oxide or equivalent condensed with the reactive hydrogen-containing compound, i.e. the length of the polyoxyalkylene chain, will depend primarily upon the particular compound with which it is condensed. As a convenient rule of thumb, an amount of alkylene oxide or equivalent should be employed which will result in a condensation product containing about 20 to 85% by weight of combined alkylene oxide. However, the optimum amount of alkylene oxide for attainment of the desired hydrophobic-hydrophilic balance may be readily determined in any particular case by preliminary test and routine experimentation.

A preferred group of nonionic surface active agents useful as reactants in the present invention are those derived from alkylphenolic compounds. Numerous compounds of this type, i.e. polyalkylene oxide derivatives of phenolic compounds containing one or more alkyl substituents are described in U.S. Patents 2,213,477 and 2,593,112. Those preferred are the polyalkylene oxide derivatives of alkyl phenolic compounds in which the total number of alkyl carbon atoms is between 4 and 20. As examples of such phenolic compounds may be mentioned normal and isomeric butyl, amyl, dibutyl, and diamyl phenols and cresols, tripropyl phenols and cresols, heptyl, octyl, nonyl, decyl, undecyl, dodecyl, tetradecyl, cetyl, oleyl, octadecyl and the like, phenols and cresols in addition to dihexyl- and trihexyl-phenol prepared from hexene-1 and phenol, diisoheptyl-phenol, dioctyl-phenol, dinonyl-phenol, dioctyl-p-cresol, dioctyl-o-cresol, didecyl-phenol, didecyl-p-cresol, didodecyl-phenol, and the like. Of particular value are the polyalkylene oxide derivatives of secondary and tertiary alkyl substituted phenols and cresols obtained by condensing olefins of the type obtained in petroleum refining with phenols or cresols. In the case of products obtained by condensing phenol or cresol with olefins of from 3 to 5 carbon atoms such as propylene, butylene or amylene, it is sometimes desirable to employ the dialkylated phenols or cresols, while in the case of compounds obtained by condensing a phenol or cresol with an olefin containing 8 or more carbon atoms, the mono-substituted derivatives can be obtained from the phenols and cresols containing a substituent derived from olefins containing from 8 to 18 carbon atoms, such as diisobutylene and other alkylenes as nonylene, decylene, undecylene, dodecylene, pentadecylene, octadecylene and mixtures thereof, and may advantageously be the dimers and trimers obtained by polymerization of such low molecular weight olefins as propylene, butylene, isobutylene, amylene or mixtures thereof.

However, the polyalkylene oxide derivatives of other organic compounds containing an active hydrogen may be employed as reactants in the present invention. Thus, the polyalkylene oxide derivatives, described in U.S. Patent 1,970,578, of aliphatic organic hydroxy compounds, may be employed if desired. As examples of water-insoluble higher fatty acids whose polyalkylene oxide derivatives may be employed may be mentioned lauric, oleic, ricinoleic, palmitic, and stearic acid, and the like, or mixtures thereof, such as the mixtures obtained from animal and vegetable fats and oils or by the oxidation of such petroleum fractions as paraffin wax. As another preferred group there may also be employed polyalkylene oxide derivatives of water insoluble aliphatic hydroxy compounds such as higher aliphatic alcohols of at least 10 carbon atoms, i.e. the alcohols corresponding to the fatty acids specified immediately above, particularly the alcohols obtainable by hydrogenation of the fatty acids or glycerides present in animal or vegetable oils and waxes such as cocoanut oil, castor oil, and the like, as well as the polyalkylene oxide derivatives of the animal and vegetable oils, fats and waxes themselves. There may also be used polyalkylene oxide derivatives of organic mercapto compounds such as the products described in U.S. Patent 2,205,021, i.e. the polyalkylene oxide derivatives of such mercapto compounds as dodecyl mercaptan, oleyl mercaptan, cetyl mercaptan, decyl mercaptan and thiophenols, thionaphthols, benzo-mercaptan, etc.; also the polyalkylene oxide derivatives of carboxylic acid amides such as those described in U.S. Patent 2,085,706, and of sulfonamides of the type described in U.S. Patent 2,002,613, or the polyalkylene oxide derivatives described in U.S. Patent 2,266,141, of sulfonic acids may be employed if desired. Similarly, the surface active polyalkylene oxide derivatives disclosed in U.S. Patent 2,677,700 may also be employed in the instant invention.

Another group of nonionic surface active agents which may be employed as reactants herein are those of the Pluronic type as disclosed for example in U.S. Patent 2,674,619 and other patents. In general, in preparing these agents a suitable 1,2-alkylene oxide or substituted alkylene oxide, as for example butylene oxide, amylene oxide, phenyl ethylene oxide (oxystyrene), cyclohexene oxide, cyclooctene oxide, or preferably propylene oxide, or a mixture thereof, is polymerized in the presence of an alkaline catalyst such as sodium hydroxide, preferably at elevated temperatures and pressures to produce the corresponding water insoluble polypropylene glycol or substituted polypropylene glycol having a molecular weight of about 300 to 3000 (i.e. about 15 to 150 carbon atoms). Said polyglycol is then reacted under similar conditions with the required number of moles of ethylene oxide to yield the desired nonionic surface active agents employed herein. These agents should generally have a molecular weight ranging from about 1200 to 15,000 and preferably about 2000 to 10,000. Alternatively, ethylene diamine, propylene diamine, other alkylene diamines and polyalkylene polyamines, in addition to ethylene glycol, propylene glycol, 1,4-butanediol, hexamethylene glycol and other diols may be reacted with the required number of moles of propylene oxide or substituted propylene oxide to produce the corresponding water insoluble polypropylene glycols and substituted polypropylene glycols having a molecular weight of about 300 to 3000 as described above, followed by reaction with the required number of moles of ethylene oxide. It will be understood that these Pluronic types of nonionic surface active agents will ordinarily be of the diol type containing two terminal hydroxy (ethanol) groups. One of these terminal hydroxy groups may be blocked by reaction with an etherifying agent, esterifying agent, or the like prior to sulfation in accordance with the process of this invention. However, if not so blocked or protected, it may in some instances be advisable to increase the proportion of this nonionic surface active agent employed in the present sulfation reaction to up to double the proportions referred to above. Whether blocked or unblocked, these agents will generally produce a more complex mixture of reaction products due to a tendency towards chaining, cross linking, and/or ring closing, and the like.

Another preferred group of nonionic surface active agents useful as reactants in the present invention are the condensation products of at least one mole of ethylene oxide with one mole of a multi-branched chain primary aliphatic alcohol having the molecular configuration of an alcohol produced by the Oxo process from a polyolefin of at least 7 carbon atoms. Such alcohols are prepared by the catalytic reaction of a polyolefin such as tripropylene, tetrapropylene, pentapropylene, diisobutylene, triisobutylene, tetraisobutylene, propylene-isobutylene, and tributene and the like with carbon monoxide and hydrogen to form an aldehyde followed by catalytic reduction of this aldehyde to a primary alcohol. This two stage process is well known as the Oxo process and alcohols produced by such process may be designated as Oxo alcohols. A particularly preferred alcohol of this type is the Oxo tridecyl alcohol produced from tetrapropylene or triisobutylene. These alcohols are reacted with the required number of moles of ethylene oxide to produce nonionic surface active agents effective as reactants herein.

The following is an illustrative, non-limitative list of some specific examples of suitable nonionic surface active agents which may be employed as reactants in the present invention. In this list "E.O." means "ethylene oxide" and the number preceding same refers to the number of moles thereof reacted with one mole of the given reactive hydrogen-containing compound.

Nonylphenol+9–11 E.O.
Nonylphenol+2 E.O.
Dinonylphenol+7 E.O.
Dodecylphenol+18 E.O.
Castor oil+20 E.O.
Tall oil+18 E.O.
Oleyl alcohol+20 E.O.
Lauryl alcohol+4 E.O.
Lauryl alcohol+15 E.O.
Hexadecyl alcohol+12 E.O.
Hexadecyl alcohol+20 E.O.
Octadecyl alcohol+20 E.O.
Oxo tridecyl alcohol (from tetrapropylene)+7 E.O.
Oxo tridecyl alcohol+10 E.O.
Oxo tridecyl alcohol+15 E.O.
Dodecyl mercaptan+9 E.O.
Soya bean oil amine+10 E.O.
Rosin amine+32 E.O.
Coconut fatty acid amine+7 E.O.
cocoa fatty acid+10 E.O.
Dodecylbenzene sulfonamide+10 E.O.
Decyl sulfonamide+6 E.O.
Oleic acid+5 E.O.
Polypropylene glycol (30 oxypropylene units)+10 E.O.

The aliphatic hydrocarbon alcohols of at least 6 carbon atoms suitable for sulfation in accordance with this invention, and methods for their production, are likewise well known in the art. In general, such alcohols may be straight or branched, saturated or unsaturated. As examples of such alcohols, there may be mentioned hexyl, lauryl, oleyl, stearyl, and other alcohols derived from natural sources in addition to the synthetic higher aliphatic alcohols, as for example, the multi-branched chain aliphatic alcohols produced from polyolefins of at least 5 carbon atoms by the Oxo process, and the relatively straight-chained aliphatic alcohols produced from Fischer-Tropsch olefins of at least 5 carbon atoms by the Oxo process. These and other similar alcohols disclosed above as suitable for oxyalkylenation may all be subjected to direct sulfation in accordance with the present process for the production of colorless or substantially colorless sulfate esters.

In carrying out the sulfation reaction in accordance with this invention, the sulfating agent is preferably added with agitation to the hydroxylic organic compound in liquid form. If the latter is a solid at room temperature, it should be heated to above its melting point. Addition of the hydroxylic compound to the sulfating agent is inadvisable since this has been found to result in the formation of tar and/or other colored bodies, and to prevent the reaction from proceeding to completion. The reaction should be carried out under substantially anhydrous conditions and the temperature should generally be controlled since too high a reaction temperature, for example over about 140° C., will tend to produce discolored and darkened products. The reaction being exothermic, cooling may in some cases be necessary. It will of course be understood that the optimum reaction temperature in any particular instance will depend upon the particular sulfating agent, hydroxylic organic compound, and other ambient conditions. Vigorous agitation during the reaction is highly desirable to facilitate and expedite completion of the reaction. The duration of reaction will again be dependent upon the reactants, the temperature employed, and the like, such completion being obvious and apparent to the worker carrying out the process.

Generally, at least an equimolar amount of the sulfating agent, and preferably an excess thereof, relative to the hydroxylic organic compound is employed. Particular reference is made to the process disclosed in U.S. 2,758,977 for particulars regarding the reaction of alkyl phenol polyglycol ethers with sulfamic acid to produce the corresponding sulfate esters. When employing sulfamic acid, it should be noted that a water soluble or dispersible salt (ammonium salt) is directly produced without subsequent neutralization of the sulfate ester with a basic substance. In such cases, subsequent treatment with basic materials is only for the purpose of neutralizing excess acid and the like.

Excellent results are also obtained when complexes of sulfur trioxide or chlorosulfonic acid are employed as sulfating agents, for example combinations of sulfur trioxide or chlorosulfonic acid with an ether such as dioxane, thioxane, or β,β'-dichlorodiethyl ether or with a tertiary nitrogen base such as pyridine or triethylamine.

Following completion of the reaction, the excess acid or sulfating agent may if desired be neutralized by treatment with the usual basic materials disclosed below. It is again emphasized that my invention is not concerned with any novelty in the method of sulfation, the hydroxylic organic compound being sulfated, or the sulfating agent employed, all such processes being well known in the prior art, see for example Ind. and Eng. Chem. 43, 2022 (1951); 45, 2041 (1953); etc. My invention is instead applicable in any of such known processes by suitable use in the reaction medium, as herein described, of the defined hypophosphorous and phosphorous acid compound.

As referred to above, the essence of my invention resides in the addition to the reaction medium of a small amount of hypophosphorous or phosphorous acid compound. Generally, about 0.01 to 5% and preferably about 0.1 to 2% of such compound, based on the weight of the hydroxylic compound being sulfated is sufficient to provide the desired improvements with respect to prevent of color degradation of the products and improvement in resistance of the products to color degradation in storage. Hypophosphorous acid and its alkali metal salts, e.g. sodium and potassium salts are generally preferred although any metal, alkaline earth metal, ammonium or amine salt of hypophosphorous acid or phosphorous acid may be employed, in addition to phosphorous acid per se. When hypophosphorous acid is employed, it is preferred to use a 30 to 50% aqueous solution thereof although aqueous solutions of this acid and other of the water soluble hypophosphorous and phosphorous acid compounds may be employed in the form of aqueous solutions ranging in concentration from less than 5 up to 70% or more. It should be borne in mind that the reaction should be carried out under substantially anhydrous conditions and accordingly the water introduced in such solutions should be held to a minimum.

The salts of hypophosphorous acid and phosphorous acid employed herein may be in their hydrated or dehydrated form. As examples of such salts, there may be mentioned aluminum, cadmium, sodium, potassium, lithium, calcium, strontium, barium, magnesium, ammonium, mono-, di-, and tri-methylamine, -ethylamine, -propylamine, -ethanolamine, and -propanolamine, pyridinyl, and morpholinyl phosphites and hypophosphites.

Esters of phosphorous acid may also be employed. These esters may be described as mono-, di-, and tri-alkyl, -aryl, and -cyclolakyl phosphites. It will be understood that mixed esters are included. As some specific examples of such esters in which the esterifying group generally contains from about 1 to 20 carbon atoms, there may be mentioned ethyl phosphite, lauryl phosphite, oxo tridecyl phosphite (the esterifying alcohol having the molecular configuration of an alcohol produced from tetrapropylene or triisobutylene by the Oxo process), stearyl phosphite, phenyl phosphite, cyclohexyl phosphite, the corresponding di- and tri-substituted phosphites, ethyl phenyl phosphite, ethyl diphenyl phosphite, lauryl cyclohexyl phosphite, dipropyl phenyl phosphite, and the like.

In accordance with this invention, the hypophosphorous or phosphorous acid compound is preferably admixed with the hydroxylic organic compound prior to addition thereto of the sulfating agent. If desired, however, such compound may be added simultaneously with the addition of the sulfating agent or, if anhydrous, may be admixed with the sulfating agent prior to its addition to the hydroxylic organic compound. It will accordingly be understood that the hypophosphorous or phosphorous acid compound or mixture thereof may be added at the start of the reaction or continuously or intermittently as the reaction proceeds.

The products of this invention may be supplied in free unneutralized form, or in the form of the partially or completely neutralized salts containing as cations alkali metals, alkaline earth metals, metals, ammonium and organic amines. Use in the form of such salts is in some instances preferred or necessary, as for example when employed in alkaline surface active and other compositions. It is to be understood that such salts are to be regarded as the equivalent of the present products in their free form. As examples of suitable cations, there may be mentioned sodium, potassium, lithium, calcium, strontium, barium, magnesium, iron, tin, cadmium, aluminum, antimony, chromium, manganese, mercury, nickel, silver, zinc, ammonium and aliphatic, alicyclic, aromatic and heterocyclic organic amines such as the mono-, di-, and tri-methylamines, -ethylamines, -propylamines, -laurylamines, -stearylamines, -ethanolamines, -propanolamines, -butanolamines, -hexanolamines, -cyclohexylamines, -phenylamines, pyridylamine, morpholinylamine, and the like.

The products of this invention, in view of their improved decolorization, have added utility in the multitude of known detergent, wetting, dispersing, and other surface active uses for such sulfate esters. The following examples are illustrative of the invention and are not to be regarded as limitative. All parts and proportions referred to herein and in the appended claims are by weight unless otherwise indicated.

Example 1

A charge of 392 parts of $C_9H_{19}C_6H_4(OCH_2CH_2)_4OH$ nonionic is placed in a vessel equipped with an agitator and a nitrogen inlet line. Nitrogen is bubbled into the charge and 110 parts of sulfamic acid added with vigorous agitation and heating. When the temperature of the reaction mixture reaches 120° C., it is held at this temperature for one hour and then neutralized with monoethanolamine to a pH of 8.0. The mixture is diluted with 131 parts of ethanol. This solution has a sulfate ester content of 79% and a VCS color of 4 when 50 parts are diluted with 15 parts of water.

Example 2

Example 1 is repeated with the exception that 1 part of 30% hypophosphorous acid is added to the nonionic prior to the sulfamic acid addition. The final product has a sulfate ester content of 77% and a VCS color below 1 when similarly diluted.

Example 3

Example 1 is again repeated with the exception that 1 part of sodium hyposphite is added to the nonionic prior to the sulfamic acid addition. The final product has a sulfate ester content of 78% and a VCS color of 2 when similarly diluted.

Example 4

Example 2 is repeated with the exception that phosphorous acid is substituted for hypophosphorous acid. The final product has a sulfate ester content of 77% and a VCS color of 2 when similarly diluted.

Example 5

Example 2 is repeated except that 1 part of triphenyl phosphite is substituted for the hypophosphorous acid. The final product has a sulfate ester content of 77% and a VCS color of 1 when similarly diluted.

Example 6

Example 2 is repeated with the exception that 1 part of triethyl phosphite is used in place of the hypophosphorous acid. The final product has a sulfate ester content of 78% and a VCS color of 1 when similarly diluted.

Example 7

Example 2 is repeated with the exception that 1 part of diethyl phosphite is substituted for the hypophosphorous acid. The final product has a sulfate ester content of 79% and a VCS color of 1 when similarly diluted.

Example 8

Example 1 is repeated with the exception that 332 parts $C_{13}H_{27}(OCH_2CH_2)_3OH$ (nonionic reaction product of 3 moles of ethylene oxide with 1 mole Oxo tridecyl alcohol from tetrapropylene) are substituted for the 392 parts of $C_9H_{19}C_6H_4(OCH_2CH_2)_4OH$. The final product has a sulfate ester content of 78% and a VCS color of 15 when 50 parts are diluted with 15 parts of water and 25 parts ethanol.

Example 9

Example 8 is repeated with the exception that 2 parts of 30% hypophosphorous acid are added to the nonionic prior to the sulfamic acid addition. The final product has a sulfate ester content of 79% and a VCS color of 7 when similarly diluted.

Example 10

Example 1 is repeated with the exception that 654 parts of $C_{18}H_{38}C_6H_3(OCH_2CH_2)_7OH$ (nonionic from dinonyl phenol) are substituted for the 392 parts of

The final product has a sulfate ester content of 78% and a VCS color of 9 when 50 parts are diluted with 15 parts acetone and 15 parts water.

Example 11

Example 10 is repeated with the exception that 1 part 30% hypophosphorous acid is added to the nonionic prior to the sulfamic acid addition. The final product has a sulfate ester content of 79% and a VCS color of 3 to 4 when similarly diluted.

Example 12

Example 1 is repeated with the exception that 526 parts of $C_{12}H_{25}C_6H_4(OCH_2CH_2)_6OH$ are substituted for the 392 parts of $C_9H_{19}C_6H_4(OCH_2CH_2)_4OH$. The final product has a sulfate ester content of 77% and a VCS color of 5 when similarly diluted.

Example 13

Example 12 is repeated with the exception that 1 part of 30% hypophosphorous acid is added to the nonionic prior to the sulfamic acid addition. The final product has a sulfate ester content of 78% and a VCS color of 1 when similarly diluted.

Example 14

A charge of 392 parts of $C_9H_{19}C_6H_4(OCH_2CH_2)_4OH$ nonionic is placed in a vessel equipped with an agitator and a gas inlet tube and heated to 70° C. A total of 74 parts of $SO_3$ are reacted with the nonionic by bubbling a mixture of $SO_3$ and $N_2$ through the charge at 70° C. over 40 minutes. The reaction mixture is neutralized by pouring it into a dilute caustic solution at room temperature to obtain a 25% sulfate ester solution having a VCS color of 2.

Example 15

Example 14 is repeated with the exception that 1 part of 30% hypophosphorous acid is added to the nonionic prior to reaction. The 25% sulfate solution has a VCS of less than 1.

Example 16

Example 14 is repeated with 186 parts of lauryl alcohol instead of the nonionic, 88 instead of 74 parts of $SO_3$, and the $SO_3$ added with $N_2$ in the same manner over 20 instead of 40 minutes. A 25% solution of the sodium salt has a VCS color of 11.

Example 17

Example 16 is repeated with the exception that 0.5 part of sodium hypophosphite is added to the alcohol prior to reaction. A 25% solution of the desired sodium salt has a VCS color of 8.

Example 18

Example 16 is repeated with 200 parts of Oxo tridecyl alcohol instead of the lauryl alcohol and 65 instead of 88 parts of $SO_3$. A 25% solution of the product which also contains 5% ethanol has a VCS color between 6 and 7.

Example 19

This experiment differs from Example 18 only in that 2 parts of 30% hypophosphorous acid are added to the alcohol prior to reaction. A 25% solution of the product which also contains 5% ethanol has a VCS color between 2 and 3.

Example 20

A charge of 325 parts of the nonionic employed in Example 8 is placed in a vessel equipped with agitator, and 117 parts of chlorosulfonic acid are added over 2 hours while the temperature is maintained at 25–35° C. Hydrogen chloride is removed while evacuating to 55 mm. The reaction mixture is then neutralized by pouring into dilute caustic. A 30% solution of the desired product in 2:1 water:alcohol has a VCS color of 7.

Example 21

Example 20 is repeated with the exception that 1 part of 30% hypophosphorous acid is added to the alcohol prior to reaction. A 30% solution of the desired product in 2:1 water:alcohol has a VCS color of 5.

*Example 22*

Example 1 is repeated substituting oleyl alcohol for the nonionic. A 30% solution of the product in 1:1 water:alcohol has a VCS color of 8.

*Example 23*

Example 22 is repeated with the exception that 1 part of diethyl hydrogen phosphite is added to the alcohol prior to reaction. A 30% solution of the product in 1:1 water:alcohol has a VCS color of 6.

*Example 24*

Example 1 is repeated substituting 204 parts of hexyl alcohol for the nonionic. A 50% solution of the product has a VCS color of 5.

*Example 25*

Example 24 is repeated with the exception that 2 parts of 50% hypophosphorous acid are added to the alcohol prior to reaction. A 50% solution of the product has a VCS color of less than 1.

*Example 26*

Example 1 is repeated with 2305 parts of $$C_9H_{19}C_6H_4(OCH_2CH_2)_{100}OH$$

nonionic. A 50% solution of the product has a VCS color of 12.

*Example 27*

Example 26 is repeated with the exception that 20 parts of 50% hypophosphorous acid are added to the alcohol prior to reaction. A 50% solution of the product has a VCS color of 9.

This invention has been disclosed with respect to certain preferred embodiments and various modifications and variations thereof will become obvious to persons skilled in the art. It is to be understood that such variations and modifications are to be included within the spirit and scope of this invention.

I claim:
1. In a process comprising reacting (1) a hydroxylic organic compound selected from the group consisting of aliphatic hydrocarbon alcohols, at about 6 to 18 carbon atoms and nonionic surface active condensation products of at least one mole of ethylene oxide with one mole of a compound containing about 6 to 150 carbon atoms and a reactive hydrogen atom, which hydrogen atom is reactive with ethylene oxide, with (2) a sulfating agent selected from the group consisting of sulfamic acid, chlorosulfonic acid and sulfur trioxide, the improvement of carrying out the reaction in the presence of about 0.01 to 5%, based on the weight of said hydroxylic organic compound, of a phosphorus-containing catalytic compound selected from the group consisting of hypophosphorous acid, phosphorous acid, and alkyl, cycloalkyl, and monocyclic aryl esters of phosphorous acid.
2. A process as defined in claim 1 wherein said hydroxylic organic compound is a condensation product of at least one mole of ethylene oxide with one mole of an alkyl phenol containing about 4 to 24 alkyl carbon atoms.
3. A process as defined in claim 1 wherein said hydroxylic organic compound is the condensation product of at least one mole of ethylene oxide with a multi-branched chain primary aliphatic hydrocarbon alcohol produced by the Oxo process from a polyolefin of about 7 to 16 carbon atoms.
4. A process as defined in claim 1 wherein said hydroxylic organic compound is the condensation product of at least one mole of ethylene oxide with one mole of a straight chain aliphatic hydrocarbon alcohol of about 10 to 18 carbon atoms.
5. A process as defined in claim 1 wherein said hydroxylic organic compound is an aliphatic hydrocarbon alcohol of about 6 to 18 carbon atoms.
6. A process as defined in claim 1 wherein said phosphorus-containing compound is hypophosphorous acid.
7. A process as defined in claim 1 wherein said phosphorus-containing compound is phosphorous acid.
8. In a process comprising adding a sulfating agent selected from the group consisting of sulfamic acid, chlorosulfonic acid and sulfur trioxide to a hydroxylic organic compound selected from the group consisting of aliphatic hydrocarbon alcohols of about 6 to 18 carbon atoms and nonionic surface active condensation products of at least one mole of ethylene oxide with one mole of a compound containing about 6 to 150 carbon atoms and a reactive hydrogen atom, which hydrogen atom is reactive with ethylene oxide, and allowing the sulfation reaction to proceed to completion, the improvement of first dissolving in the said hydroxylic organic compound about 0.1 to 5%, based on the weight of said hydroxylic organic compound, of a phosphorus-containing catalytic compound selected from the group consisting of hypophosphorous acid, phosphorous acid, and alkyl, cycloalkyl, and monocyclic aryl esters of phosphorous acid.
9. A process as defined in claim 8 wherein said hydroxylic organic compound is a condensation product of at least one mole of ethylene oxide with one mole of an alkyl phenol containing about 4 to 24 alkyl carbon atoms.
10. A process as defined in claim 8 wherein said hydroxylic organic compound is an aliphatic hydrocarbon alcohol of about 6 to 18 carbon atoms.
11. A process as defined in claim 8 wherein said phosphorus-containing compound is hypophosphorous acid.

References Cited in the file of this patent

UNITED STATES PATENTS

| | | |
|---|---|---|
| 1,948,299 | Jahrstorfer et al. | Feb. 20, 1934 |
| 2,593,112 | Cross et al. | Apr. 15, 1952 |

OTHER REFERENCES

Berkman et al.: "Catalysis," Reinhold Publishing Corp., New York, 1940, page 702.

Conant et al.: "The Chemistry of Organic Compounds," The MacMillan Company, New York, 4th edition, 1952, page 140.

Gilbert et al.: "Industrial and Engineering Chemistry," volume 45, pages 2041–64, September 1953.

UNITED STATES PATENT OFFICE
CERTIFICATE OF CORRECTION

Patent No. 3,150,161                      September 22, 1964

Leslie G. Nunn, Jr.

It is hereby certified that error appears in the above numbered patent requiring correction and that the said Letters Patent should read as corrected below.

Column 9, line 45, for ", at" read -- of --.

Signed and sealed this 6th day of April 1965.

(SEAL)
Attest:

ERNEST W. SWIDER                      EDWARD J. BRENNER
Attesting Officer                       Commissioner of Patents